No. 635,732. Patented Oct. 24, 1899.
A. HAMMOND.
FLY TRAP.
(Application filed Nov. 19, 1898.)
(No Model.)
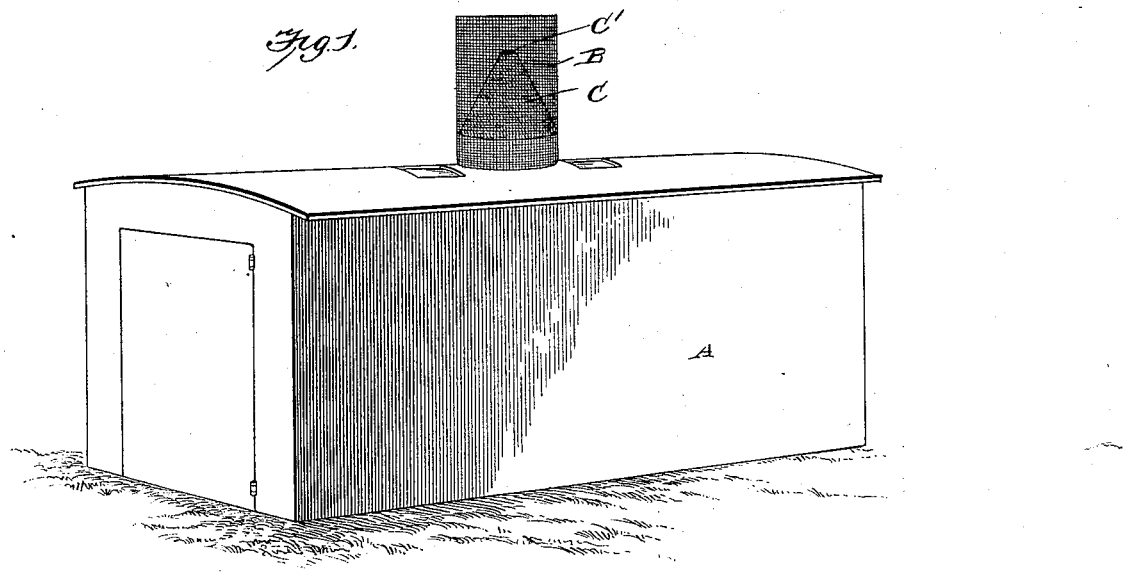
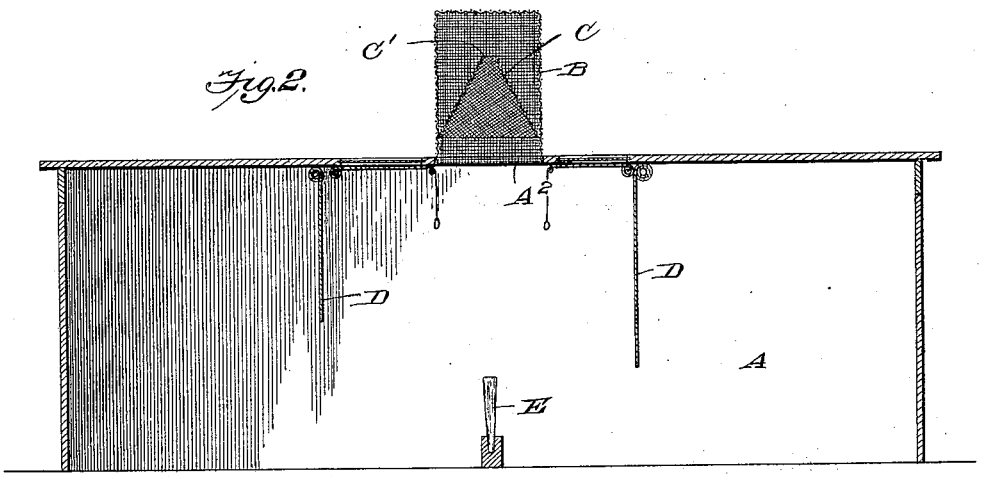
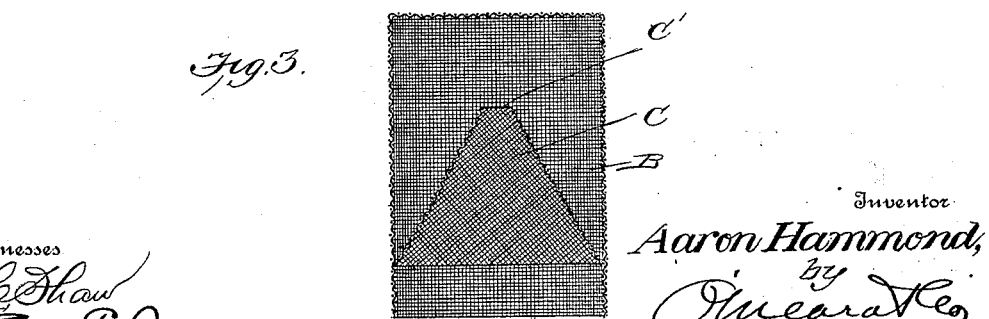
Witnesses
J. C. Shaw
Chas. E. Brock
Inventor
Aaron Hammond,
by
O'Meara & Co.
Attorneys

UNITED STATES PATENT OFFICE.

AARON HAMMOND, OF HARRIS, MISSOURI.

FLY-TRAP.

SPECIFICATION forming part of Letters Patent No. 635,732, dated October 24, 1899.

Application filed November 19, 1898. Serial No. 696,920. (No model.)

*To all whom it may concern:*

Be it known that I, AARON HAMMOND, a citizen of the United States, residing at Harris, in the county of Sullivan and State of Missouri, have invented a new and useful Fly-Trap, of which the following is a specification.

This invention relates generally to fly-traps, and more particularly to one intended to be used in connection with a device for removing the flies from cattle, the object being to provide a cheap and simple appliance which can be used in connection with stables and barns for the purpose of driving flies from the cattle as they pass to the said stable or barn.

With this object in view the invention consists, essentially, of a covered way having a trap arranged centrally in the top thereof, beaters or scrapers depending from the top of said way to brush the flies from the backs of the animals, and an upwardly-projecting brush or beater arranged about the center of the way along the bottom thereof for the purpose of brushing the flies from the legs and stomach of the animal.

The invention consists also in certain details of construction and novelties of combination, all of which will be fully described hereinafter and pointed out in the claims.

In the drawings forming part of this specification, Figure 1 is a perspective view of my improved device. Fig. 2 is a vertical longitudinal section, and Fig. 3 is a detail view of the fly-trap proper.

In the practical embodiment of my invention I employ a covered way A, which may be of any length desired, but preferably about forty feet in length, six feet in width, and seven feet in height, said way being provided with a door at each end. This way is intended to be used as a preliminary passage-way into the stable or barn in which the cattle are to be kept, and the purpose of arranging the said covered way at this point being to remove the flies from the cattle and then entrap them after such removal. A central opening $A^2$ is made in the top or roof of the way, and fitted in said opening is a gauze cylinder B of the trap, said cylinder having a gauze cone C arranged therein, so as to be removable, said cone having a small opening C' in the top thereof, through which the flies can pass into the cylinder, but through which they will not repass to escape from the said cylinder.

In order to remove the flies from the cattle, so that they can pass up into the trap, I employ the depending aprons or brushes D, which hang from the roof of the way upon each side of the central opening and adjacent thereto, said brushes to be made adjustable, so that they will brush the backs and flanks of the cattle as they pass through the way, and the flies being thus removed will immediately fly upwardly through the light-opening in the center and in this way enter the trap, it being of course understood that the remainder of the way is dark, the only light-opening being the opening at the top in which the trap is fitted.

An upwardly-projecting brush E is arranged upon the bottom of the way directly beneath the trap, said brush projecting far enough upward to brush the cattle as they pass therefrom, whereby all of the flies will be removed from the cattle as they pass beneath the depending aprons or brushes and over the upwardly-projecting brush.

It will thus be seen that I provide an exceedingly simple and efficient means for brushing the flies from the cattle as they pass to the barn and then entrapping the said flies, thereby preventing them reëntering the barn and annoying the cattle.

Windows may be arranged in the roof, if desired, and covered by a curtain, except when the cattle are driven through.

Having thus fully described my invention, what I claim as new, and desire to secure by Letters Patent of the United States, is—

1. In a device of the kind described, a covered way having an opening in the top thereof and a trap arranged in said opening and above the top of the way, and the depending aprons or brushes arranged within the way upon opposite sides of the central opening, and an upwardly-projecting brush positioned at the bottom of the way and intermediate of the depending brushes, substantially as shown and described.

2. In a device of the kind described, the covered way, a central opening in the top thereof, a trap fitted in said opening and arranged above the top of the way, light-admitting apertures in the top of the way, the depending apron suspended from the top and upon opposite sides of the openings and extending entirely across the way, and the upwardly-extending brushes arranged across the bottom thereof, beneath the trap and intermediate of the depending curtains, substantially as described.

AARON HAMMOND.

Witnesses:
E. H. ODNEAL,
W. H. ODNEAL.